United States Patent
Lietz

(12) 
(10) Patent No.: US 6,508,972 B1
(45) Date of Patent: Jan. 21, 2003

(54) METHOD FOR MANUFACTURING RUBBER TUBES

(76) Inventor: Robert E. Lietz, 845 20th St., Jasper, IN (US) 47546

(*) Notice: Subject to any disclaimer, the term of this patent is extended or adjusted under 35 U.S.C. 154(b) by 0 days.

(21) Appl. No.: 09/519,111

(22) Filed: Mar. 6, 2000

(51) Int. Cl.[7] .............................................. B29C 47/00
(52) U.S. Cl. ...................... 264/407; 264/148; 264/150; 264/209.6; 264/236
(58) Field of Search ................................. 264/407, 406, 264/148, 149, 150, 236, 209.6, 40.5, 40.7

(56) References Cited

U.S. PATENT DOCUMENTS

| | | |
|---|---|---|
| 2,770,841 A | 11/1956 | Cooke et al. |
| 3,929,957 A | 12/1975 | Holden et al. |
| 4,104,098 A | 8/1978 | Hush et al. |
| 4,118,162 A * | 10/1978 | Baumgarten .............. 264/209.3 |
| 4,174,365 A | 11/1979 | Pahl |
| 4,242,296 A * | 12/1980 | Bricker ........................ 156/143 |
| 4,435,351 A | 3/1984 | Gilmore |
| 4,882,101 A | 11/1989 | Ohkita et al. |
| 5,937,521 A * | 8/1999 | March et al. ................ 264/148 |

OTHER PUBLICATIONS

Gear Extruden Data Sheet. Davis–Standard Corp 1999.
Coloer Microwave Rubber Vulcanization Systems data sheet. Coloer Electronics Inc. No date.

* cited by examiner

Primary Examiner—Mark Eashoo
(74) Attorney, Agent, or Firm—David Kiewit

(57) ABSTRACT

An efficient process is described for making rubber tube segments, such as lathe-cut gaskets or conveyor roller covers, by cross-head extrusion of uncured rubber onto an axially aligned string of mandrels. Each mandrel in the string is separated from its two neighbors by respective spacers. The outer diameter of the extruded tube is kept within precise tolerances by making a non-contact measurement of the outer diameter at the output from the extruder and using the measured diameter to control the extrusion process. The extruded tube is cut into segments by a cutter that acts responsive to a spacer sensor and that makes the cuts between the mandrels. In one version, the extruded tube is conveyed through a curing oven by apparatus that only contacts and supports the tube adjacent ones of the spacers.

12 Claims, 3 Drawing Sheets

METHOD FOR MANUFACTURING RUBBER TUBES

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The invention relates to the manufacture of elastomeric tubes and rings. It is particularly concerned with a more efficient process for making lathe-cut rubber gaskets.

2. Background information

Lathe-cut rubber gaskets are widely used as jar rings and for sealing an automotive oil filter cartridge against a flange on an engine block. These gaskets have been made for many years by a labor-intensive process generally consisting of the following steps:

1) Extruding an uncured rubber tube and cutting it to a convenient length for handling on a mandrel (e.g., thirty inches).
2) Blowing the tube onto a curing mandrel and curing the rubber in a convection oven or an autoclave and thereby setting the internal diameter of the gasket;
3) Blowing the cured rubber tube off the curing mandrel and blowing it onto a grinding mandrel.
4) Grinding the outside of the tube to remove flats or bulges causing the tube to be out of specification for roundness, and also to set the external diameter of the gasket.
5) Blowing the tube off the grinding mandrel and blowing onto a cutting mandrel.
6) Forming a plurality of gaskets from each tube by using a lathe to cut the tube into rings of a predetermined length.

Other references of note in this area are:

U.S. Pat. No. 3,929,987 in which Holden et al. describe a process for making a flexible thermoplastic tube by coating a quasi-continuous mandrel made up of a number of interfitting segments. After forming the tube Holden et al. soften it by heating and then pull the continuous tube apart into segments.

U.S. Pat. No. 2,770,841, in which Cooke et al. describe a process for making and curing a continuous elastomeric tube having controlled ID and OD. Their cured tube is cut into rings.

U.S. Pat. No. 4,882,101 in which Ohkita et al. describe making reinforced rubber hose having controlled ID and OD by extruding the rubber over a continuous mandrel. Ohkita et al. use a plastic co-extruded mandrel that is chopped up and recycled when the hose is cut to length.

U.S. Pat. No. 4,174,365 in which Pahl describes both a mandrel that can be destroyed and recovered without cutting the hose and a machine for recirculating mandrels. Pahl's arrangements allow for the fabrication of arbitrarily long hoses.

U.S. Pat. No. 4,104,098 (Hush et al.) and U.S. Pat. No. 4,512,912, (Babbin et al.) both show microwave curing (or partial curing) of extruded rubber hose.

BRIEF SUMMARY OF THE INVENTION

A feature of the invention is a process for extruding rubber onto a series of spaced mandrels so as to form a segmented tube having precisely controlled internal and outer diameters, and for then cutting the tube into lathe-cut gaskets.

An advantage of a preferred embodiment of the invention is a reduction in the number of times a tube is blown onto or off of a mandrel in the process of making lathe-cut rubber rings. In a particular embodiment, a prior art process using five steps is replaced by a process using only two.

A feature of a preferred embodiment of the invention is the use of a non-contact diameter measurement means to determine the wall thickness of a tube extruded from a cross-head to yield a rubber tube having a precisely controlled outer diameter so that the grinding step of the prior art process can be at least reduced in extent and possibly avoided.

Another feature of a preferred embodiment of the invention is an arrangement for cutting a continuous tube, formed around a string of mandrels axially separated from each other by spacers, into tube segments by means that locate the spacers and make the cuts at the spacer locations.

Although it is believed that the foregoing recital of features and advantages may be of use to one who is skilled in the art and who wishes to learn how to practice the invention, it will be recognized that the foregoing recital is not intended to list all of the features and advantages. Moreover, it may be noted that various embodiments of the invention may provide various combinations of the hereinbefore recited features and advantages of the invention, and that less than all of the recited features and advantages may be provided by some embodiments.

DETAILED DESCRIPTION OF THE INVENTION

Figure 1:
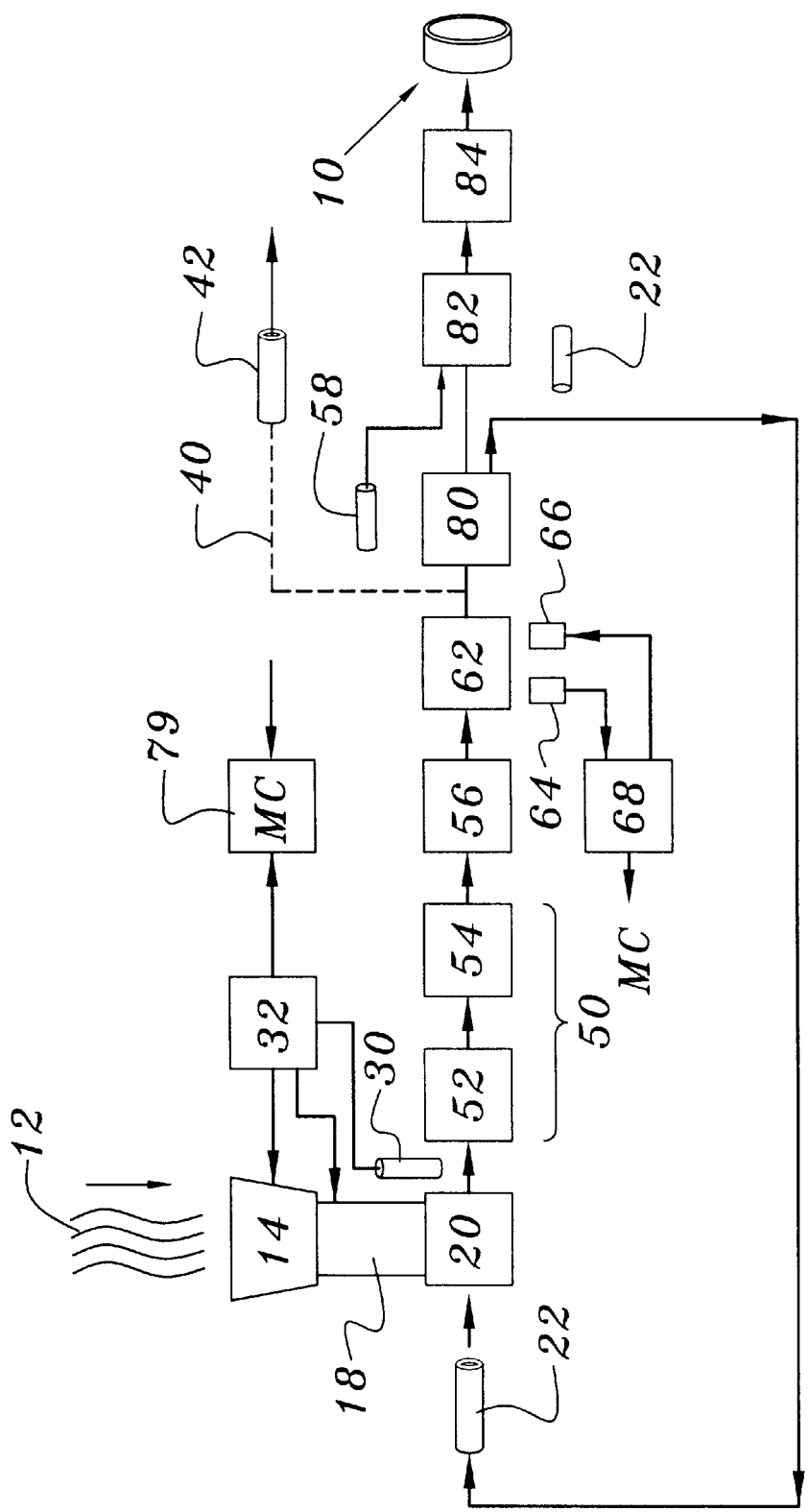
FIG. 1 is a schematic flow chart of the overall process of the invention.

A new process for making lathe-cut gaskets 10 begins by feeding uncured rubber 12, preferably in the form of strips, into a conventional screw-type extruder 14 that preferably has a gear extruder 18 attached to its output port, an arrangement that is known to improve output stability, The gear extruder 18, which may be a Model 120 Gear Extruder made by the Davis-Standard Company of Pawcatuck, Conn, is a low shear device that can provide high pressure pumping capability at low extrudate temperature. It will be understood to those skilled in the material arts that although this description refers to the working material as "rubber", that term is not limited to natural rubber, but is taken to include any sort of material that can be formed when in an initial, uncured state and then cured, or cross-linked, to form an elastomeric intermediate or final product.

In a preferred process, the uncured rubber extrudate from the gear pump 18 is fed into one inlet port of cross-head 20 at a temperature of about 180° F. An axially aligned plurality of extrusion mandrels 22 is fed into a second inlet port of the cross-head 20 at a controllable rate that is generally held constant for a given extrusion run. Each of the mandrels 22 is separated from its neighbors by spacers 24. As is known in the art, the cross head 20 may be provided with a selected removable die 26 that can be changed when a different diameter tube 16 is to be made. This die 26 can be used in combination with a conventional pin (not shown) that can extend through the die 26 into the mandrel feed tube 28 at the beginning of an extrusion process.

As described above, one of the goals of the new process is to greatly reduce or entirely eliminate grinding operations that are required in the prior art in order to product a gasket 10 having both an outer diameter and an inner diameter that deviate by less than a tolerance value (commonly five one-thousandths of an inch) from respective nominal values. A preferred new process addresses this matter of accurate dimensional control by using closed loop control apparatus to control the outer diameter of the extruded tube 16. This is done with a non-contact thickness measurement apparatus 30 that is preferably located near the output from the cross-head 20. The thickness measurement apparatus has an output to a extrusion controller 32 that determines if the outer diameter is within tolerance and that provides a control output for controlling the outer diameter by either changing the extrudate delivery rate or by varying the speed at which the rubber tube 16 leaves the die 26. Thus, if the measured tube diameter becomes too great, the gear pump 18 may be slowed so as to decrease the extrudate delivery rate, or the rate at which the tube 16 moves may be increased by either pushing the mandrels 22 into the cross-head 20 faster, or increasing the speed of a conveying means used to move the extruded tube 16.

The non-contact thickness measurement apparatus 30 may be of the type generally referred to as a laser micrometer. In an instrument of this sort, a collimated light source 34, which may be a laser, generates a linear beam, or swath, of parallel light rays 36 that is partially occluded by the opaque tube 16. A linear photosensor 38, which may comprise an array of charge coupled devices, determines the width of the occluded swath and supplies that datum to the extrusion controller 32. It will be understood to those skilled in the art that other sorts of non-contact measurement techniques, such as capacitive sensing, could also be used as long as they delivered a measurement accuracy compatible with the goal of holding the outer diameter of the tube 16 to within +/−0.005".

It may be noted that if the spacers 24 do not have the same diameter as the mandrels 22, the extruded tube 16 may have necked (if the spacers are smaller) or bulged (if the spacers are larger) regions along its length. As will be described in greater detail hereinafter, this measurable change in diameter may be actually be useful in controlling a cutting operation used to segment the tube 16. In controlling the outer diameter of the extruded tube 16, however, a preferred system will essentially ignore whatever necking or bulging is associated with spacers. This may be done either by measuring the diameter only over the mandrels or, preferably, by suitably programming the extrusion controller 32 to not generate a control signal responsive to diameter measurements made over spacers 24 and to thereby provide a control output responsive only to diameter measurements made over a mandrel 22.

Figure 2:
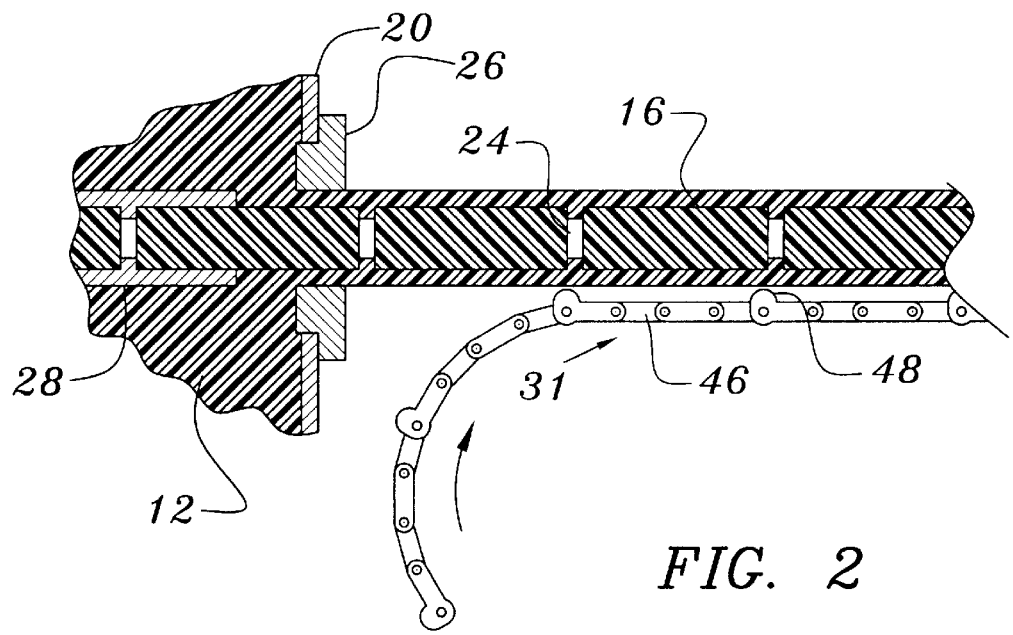
FIG. 2 is a cross-sectional detail of an extrusion operation.

Because of the tight tolerances involved, it is desirable to provide special handling means for handling the uncured tube in order to avoid distortions. For example, moving the tube from the extrusion die 26 to the curing apparatus 50 on a conventional roller conveyor could flatten the bottom of the tube. In order to avoid this problem, a preferred process employs special conveying apparatus 31 adapted to contact and support the tube 16 only immediately adjacent the spacers 24 while conveying the tube 16 from the cross-head through the curing apparatus 50 This may be done, as depicted in FIG. 2, by the use of a chain belt 46 comprising a plurality of upstanding portions 48 that are spaced out along the belt 46 by a distance equal to the distance along the tube axis 60 between the centers of adjacent spacers 24.

In the preferred process the extruded tube 16 moves from the cross-head 20 to a curing station 50 that preferably comprises a microwave oven 52 used to rapidly heat the tube 16, and a convection over 54 used to hold the tube 16 at the curing temperature (which may be on the order of 350° F.) for a long enough time to complete the cure. As is known in the art, microwave vulcanization equipment, which may be furnished by Cober Electronics, Inc., of Norwalk Conn., provides faster heating than do convection ovens. This, in turn, allows a tube manufacturer to use a shorter production line and thereby make more efficient use of his floor space.

Because the diameter of the mandrel 22 sets the internal diameter of the finished product, it is important to make the mandrel from a material that retains a modicum of strength at the curing temperatures (e.g., does not sag or become misshapen, as is the case with many thermoplastic mandrels). Although the mandrel 22 may be made of various metals, in a preferred process the mandrel 22 is fabricated from a glass filament-wound thermosetting phenolic material that can be used repeatedly at whatever curing temperature is needed without being degraded by the heat. One advantage of the thermoset mandrel over a metal one is that the thermoset material has a much lower thermal conductivity. This makes handling the mandrels much easier inasmuch as there is little heat transfer from the rubber to the mandrel during extrusion and curing. It is expected that the use of metal mandrels would require an additional pre-heating step to bring each metal mandrel to a selected temperature before pushing it into the cross-head 20.

After curing, the cured rubber tube is cooled in a water bath 56 before cutting into segments Although it is preferred to cure the tube before cutting, it will be understood by those skilled in the art that one could cut the continuous extruded tube into segments and then cure batches of the segments, e.g., in a convection oven 54 or steam autoclave.

The extruded tube 16 is, in the preferred process, cut into segments 42 having a length compatible with existing lathe-cutting mandrels 58. The tube segments are removed from the extrusion mandrel 22 and mounted on a separate cutting mandrel 58 partly to avoid damaging the extrusion mandrel, which must have a smooth outer surface with a carefully controlled diameter, during the lathe-cutting operation.

As discussed above, in the preferred process the extruded tube 16 is formed around a sung of extrusion mandrels 22 spaced apart along the tube axis 60 by spacers 24 that are substantially shorter, as measured along the tube axis 60, than are the mandrels 22. Although the mandrels 22 may be as short as eighteen inches, a preferred length is in the range from thirty to thirty eight inches. The spacers 24 may be as short as about one quarter of an inch, but in preferred embodiments are selected to range from three quarters of an inch to one inch in length. It may be noted that although the lengths of the spacers and mandrels is a matter of choice, once a choice has been made a manufacturer is generally constrained to use that length for all production on a given line in order to avoid having to largely reconfigure the line whenever a mandrel length is changed. The diameter of mandrels, on the other hand, is expected to be changed from run to run in order to make a variety of tubes having differing internal diameters.

Figure 4:
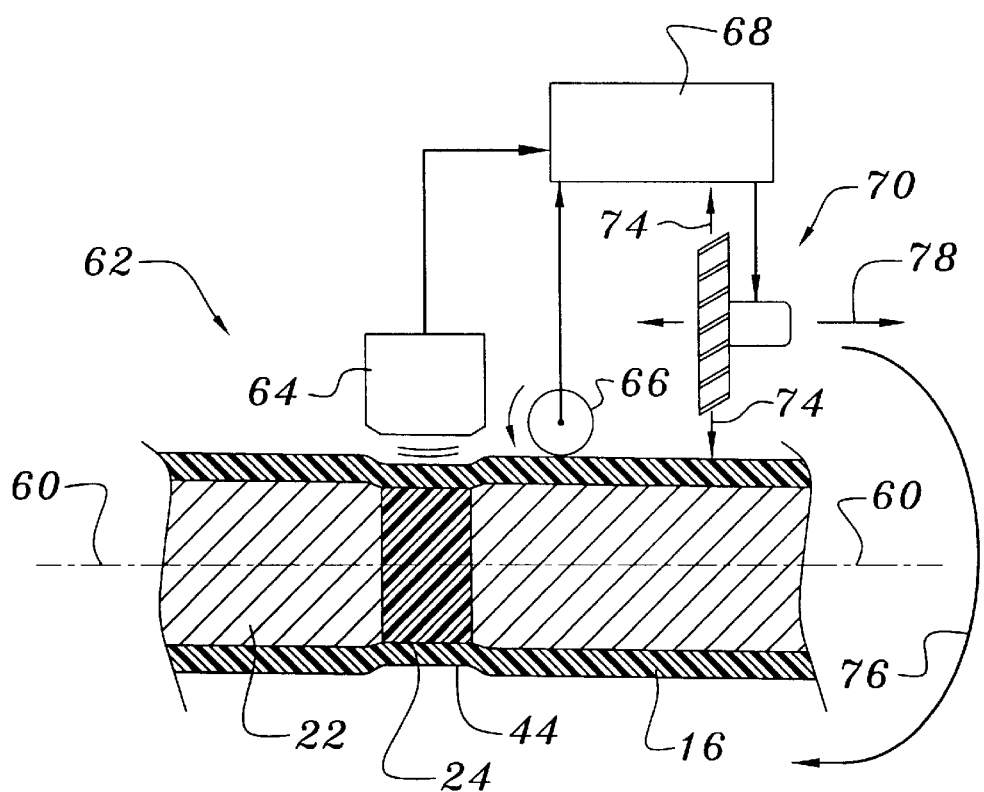
FIG. 4 is a cross-sectional detail of a cutting portion of the process.
Figure 3:
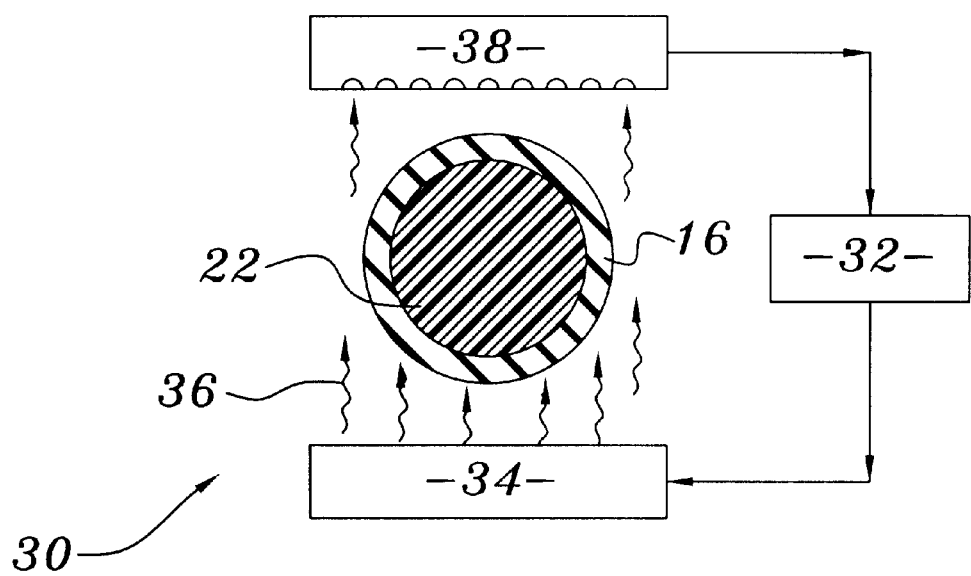
FIG. 3 is a schematic detail of a wall thickness control portion of the process.

Turning now to FIG. 4 of the drawing, one finds a schematic detail view of a preferred cutting apparatus 62 adapted to cut the tube into segments by sensing the location and speed of each of the spacers and then cutting into the tube 16 at each of the spacer positions so as to separate the tube 16 into segments 42. This apparatus preferably comprises a spacer sensor 64 and a tube speed sensor 66 disposed adjacent the moving rubber tube, where both sensors 64,66 have respective outputs to a cut-off controller 68. The spacer sensor 64 is preferably an ultrasonic sensor, and the tube speed sensor 66 may be one of the well known rolling-wheel type, or may be any of a number of non-contact motion sensors. Inasmuch as the spacers 24 may be selected to have a diameter slightly less than that of the mandrel 22, a process of the invention may produce a tube 16 having necked regions 44 of slightly smaller outer diameter over each spacer 24. Thus, one alternative to an ultrasonic sensor could be a laser micrometer of the same general sort as described earlier herein.

The cut-off controller 68 combines the outputs from the spacer sensor 64 and the tube speed sensor 66 with data on the position of a cut-off device 70 that is preferably spaced apart from the sensors. Thus, the cut-off controller can direct the cut-off device to cut into the tube 16 at the spacer location between two adjacent mandrels 22, Any of a number of known cut-off devices may be used for this operation. In one preferred embodiment the cut is made by a saw 72 mounted adjacent the path of the tube by suitable mounting means (not shown) allowing the saw 72 to move from the depicted idling position to a cutting position (as indicated by the arrow 74), to move around the tube (as depicted by the arrow 76) and to move along with the tube 16 while the cut is being made (as shown by the arrow 78). In this embodiment the depth of saw cut can be set so that the saw cuts close to the outer surface of the spacer 24 so that the spacer 24 can be recovered and reused. In another embodiment (not depicted) a simpler, drop-cut or guillotine arrangement is used in which a large knife moves quickly, under control of the cut-off controller 68, through the tube 16 and spacer 24. In this case, the knife motion can be fast enough that no longitudinal compensating motion 78 need be provided. Although this second embodiment is somewhat simpler, it necessarily destroys a spacer 24 at each cut.

Those versed in the industrial controller arts will understand that the operations described above as being carried independently by an extrusion controller 32 and a cut-off controller 68 could be coordinated by a single master controller 79, or could be carried out by the master controller 79 receiving input data from the thickness measuring apparatus 30 and from the sensors operatively associated with the cut-off apparatus 62.

After a segment containing a single extrusion mandrel 22 has been cut off the tube 16, the tube segment is blown off the extrusion mandrel in a mandrel-removing step 80, which may be carried out in accordance with processes well known in the prior art. The removed mandrel 22 may then be sent back to be re-loaded into the cross-head 20. A cutting mandrel 58 is then substituted for the extrusion mandrel in a mandrel-insertion step 82, and the tube segment is then cut into rings 10 in a conventional lathe-cutting step 84. In an alternate process 40, in which the final product is a tube segment 42 adapted to be used as a roller cover for an industrial roller conveyor, the tube segments 42 need not be subjected to the additional cutting step 84.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. An extrusion process for making a plurality of rubber tube segments, wherein each of the segments has an outer tube diameter that deviates by less than a tolerance value from a nominal value, the process comprising the sequentially executed steps of:

a) extruding an uncured rubber tube onto a plurality of axially aligned extrusion mandrels, wherein each of the extrusion mandrels has a single outer mandrel diameter and is separated from two neighboring mandrels by respective spacers;

b) measuring an outer tube diameter of a portion of the uncured rubber tube disposed about one of the mandrels by non-contact measurement means having an output to an extrusion controller;

c) comparing the outer tube diameter measured about the one of the mandrels with the nominal value and changing the outer tube diameter by means of an output from the extrusion controller if the measured outer tube diameter deviates from the nominal value by more than the tolerance value; and d) forming the tube segments by cutting into the tube adjacent each of spacers.

2. The method of claim 1 wherein the output from the extrusion controller acts to change the extrudate delivery rate.

3. The method of claim 1 wherein the output from the extrusion controller acts to change a rate at which the tube is conveyed to a curing oven.

4. The method of claim 1 further comprising a step c1) intermediate step c) and step d) of conveying the uncured rubber tube through a curing oven by means of apparatus contacting the tube only adjacent ones of the spacers.

5. The method of claim 1 further comprising a step e) subsequent to step d) of curing each of the tube segments.

6. The method of claim 1 wherein, in step a), the uncured rubber tube is extruded onto the mandrels in a cross-head extruder having a first inlet port operatively connected to an output port of a gear pump, the cross-head extruder also having a second inlet port for receiving the mandrels.

7. An extrusion process for making a plurality of cured rubber tube segments having a selected length, the process comprising the sequentially executed steps of:

a) extruding an uncured rubber tube onto a plurality of axially aligned extrusion mandrels, wherein each of the extrusion mandrels has a single outer mandrel diameter and is separated from two neighboring mandrels by respective spacers;

b) measuring an outer tube diameter of the uncured rubber tube disposed about one of the mandrels by non-contact measurement means having an output to an extrusion controller;

c) comparing the outer tube diameter measured about one of the mandrels with a nominal value and changing the outer tube diameter by means of an output from the extrusion controller if the measured outer tube diameter deviates from the nominal value by more than a selected tolerance value;

d) sensing, by means of a spacer sensor disposed adjacent the rubber tube, the position of each spacer, and e) separating the tube into the plurality of segments by cutting into the tube at the sensed position of each spacer.

8. The process of claim 7 wherein step d) comprises sensing the speed of the spacer as well as its position and wherein step e) is carried out by means of a cut-off device that is spaced apart from the spacer sensor.

9. The process of claim 7 wherein the spacer sensor comprises an ultrasonic sensor.

10. The process of claim, 7 wherein each of the spacers has a second selected diameter different from the single outer diameter of the mandrels and wherein the spacer sensor comprises a non-contact diameter measurement means.

11. The process of claim 7 further comprising a step a1) subsequent to step a) and prior to step b) of conveying the tube through a curing oven.

12. The process of claim 7 further comprising a step f) subsequent to step e) of curing each of the tube segments.

* * * * *